(12) United States Patent
Iwai et al.

(10) Patent No.: US 10,151,367 B2
(45) Date of Patent: Dec. 11, 2018

(54) FRICTION MATERIAL

(71) Applicant: AKEBONO BRAKE INDUSTRY CO., LTD., Tokyo (JP)

(72) Inventors: Yu Iwai, Tokyo (JP); Saki Maruta, Tokyo (JP); Yoichi Kawashima, Tokyo (JP); Hiroshi Isobe, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/798,441

(22) Filed: Oct. 31, 2017

(65) Prior Publication Data

US 2018/0119764 A1 May 3, 2018

(30) Foreign Application Priority Data

Nov. 1, 2016 (JP) .................. 2016-214346

(51) Int. Cl.
| | |
|---|---|
| *C09K 3/14* | (2006.01) |
| *F16D 69/02* | (2006.01) |
| *C04B 35/462* | (2006.01) |
| *C04B 35/80* | (2006.01) |

(52) U.S. Cl.
CPC .......... *F16D 69/026* (2013.01); *C04B 35/462* (2013.01); *C04B 35/80* (2013.01); *C09K 3/14* (2013.01); *F16D 2200/0065* (2013.01); *F16D 2200/0069* (2013.01); *F16D 2200/0086* (2013.01)

(58) Field of Classification Search
CPC ......... C04B 35/80; C04B 35/462; C09K 3/14; F16D 69/026; F16D 2200/0065; F16D 2200/0086; F16D 2200/0069
See application file for complete search history.

(56) References Cited

U.S. PATENT DOCUMENTS

| | | | |
|---|---|---|---|
| 2,937,397 | A1 | 12/2015 | Onda et al. |
| 2001/0005547 | A1 | 6/2001 | Hikichi |
| 2015/0369320 | A1 | 12/2015 | Onda et al. |
| 2017/0291855 | A1 | 10/2017 | Kamada |
| 2018/0106321 | A1 * | 4/2018 | Matsuba ............... F16D 69/026 |

FOREIGN PATENT DOCUMENTS

| | | | |
|---|---|---|---|
| EP | 2937397 A1 | 10/2015 | |
| JP | H10-139894 A | 5/1998 | |
| JP | 2001-172612 A | 6/2001 | |
| JP | 2007-277418 A | 10/2007 | |
| JP | 2015-147913 A | 8/2015 | |
| WO | WO-2000-55275 A1 | 9/2000 | |
| WO | WO-2016-063688 A1 | 4/2016 | |
| WO | WO-2017183155 A1 * | 10/2017 | ............... C09K 3/14 |

OTHER PUBLICATIONS

Extended European Search Report dated Jun. 18, 2018 in European Patent Application No. 17199185.4.

* cited by examiner

*Primary Examiner* — Anthony J Green
(74) *Attorney, Agent, or Firm* — Drinker Biddle & Reath LLP

(57) ABSTRACT

A friction material includes a fiber base material, a friction modifier and a binder. The friction modifier includes two or more kinds of titanate compounds. The two or more kinds of titanate compounds have a median diameter (D50) of 20 μm or more. At least one of the two or more kinds of titanate compounds is a porous titanate compounds. The friction material includes no copper component.

19 Claims, No Drawings

# FRICTION MATERIAL

CROSS-REFERENCE TO RELATED APPLICATIONS

This application claims priority from Japanese Patent Application No. 2016-214346 filed on Nov. 1, 2016, the entire subject matter of which is incorporated herein by reference.

BACKGROUND OF THE INVENTION

Technical Field

The present invention relates to a friction material to be used for disc brake pads, brake linings and clutch facings of automobiles, railway vehicles, industrial machines, etc.

Background Art

A friction material used for brakes such as disc brakes and drum brakes or clutches used in automobiles, etc. is generally formed of materials such as a friction modifier for imparting a friction function and modifying friction performance thereof, a fiber base material having a reinforcing function and a binder for integrating these ingredients to impart strength. The friction material plays a role of changing kinetic energy to thermal energy by frictional engagement with a counterpart material thereof, so that excellent heat resistance, wear resistance, high friction coefficient and stability of the friction coefficient are necessary, and further, it is also required that squeal is less likely to be generated.

For the purpose of improving the strength, the heat resistance and the wear resistance of the friction material and ensuring the friction coefficient during high load, potassium titanate fiber has been conventionally used as the fiber base material. However, the potassium titanate fiber is respirable in size, and the possibility of being cracked into more respirable thin fiber is pointed out. Accordingly, the use thereof is unfavorable on working environmental.

In recent years, therefore, it has been discussed to use a non-fibrous titanate as a substitute for the potassium titanate fiber. For example, Patent Documents 1 and 2 disclose friction materials which can provide the friction function and strength equivalent to those in the conventional ones, without using a whisker-shaped titanate compound.

In addition, as another fiber base material, copper fiber has a function of enhancing fade resistance because it is a material having excellent ductility and high thermal conductivity. The copper fiber is sometimes used as a copper powder in a powdery form. However, in a friction material containing copper or a copper alloy, copper is contained in wear debris generated by braking, and the possibilities of causing pollution of rivers, lakes and oceans, etc. have been pointed out. Therefore, movements to restrict the use thereof have increased.

In recent years, therefore, friction materials having excellent friction function even when the content of a copper component having a high environmental load is small have been developed. For example, Patent Document 3 discloses a friction material not containing copper which shows a friction coefficient and wear resistance equivalent to those of a friction material containing copper by allowing a titanate having a tunnel-like crystal structure and a titanate having a lamellar crystal structure to be contained as titanates. In addition, Patent Document 4 discloses a friction material showing excellent fade resistance regardless of the presence or absence of a copper powder.

Patent Document 1: JP-A-2001-172612
Patent Document 2: JP-A-2007-277418
Patent Document 3: JP-A-2015-147913
Patent Document 4: WO-A1-2016/063688

SUMMARY OF THE INVENTION

However, the techniques described in Patent Documents 1 and 2 have had room for improvement in terms of fade properties, high-speed effectiveness, wear resistance and strength of the friction material. In addition, the technique described in Patent Document 3 has also had problems in wear resistance and strength of the friction material. Furthermore, in order to suppress generation of squeal, reduction in sticking to a counterpart material in high-temperature and high-load braking is required for the friction material. However, in the friction material described in Patent Document 4, the sticking to the counterpart material at high temperature is not discussed, and the effect thereof has been unknown.

The present invention has been made in view of the above-described circumstances, and an object thereof is to provide a friction material containing no copper component, which improves wear resistance, ensures the friction coefficient in high-temperature and high-load braking, and further suppresses sticking to a counterpart material at high temperature.

The present inventors have made inventive studies, and as a result, it has been found that the above problems can be solved by the combined use of at least two specific titanate compounds, and the present invention has been completed.

That is, the present invention provides the following friction material.

<1> A friction material comprising a fiber base material, a friction modifier and a binder, wherein the friction modifier comprises two or more kinds of titanate compounds, the two or more kinds of titanate compounds have a median diameter (D50) of 20 µm or more, at least one of the two or more kinds of titanate compounds is a porous titanate compounds, and the friction material comprises no copper component.

<2> The friction material according to <1>, wherein of the two or more kinds of titanate compounds, the porous titanate compound has the largest median diameter (D50).

<3> The friction material according to <1> or <2>, wherein the porous titanate compound has a median diameter (D50) of 70 to 200 µm.

<4> The friction material according to any one of <1> to <3>, wherein of the two or more kinds of titanate compounds, at least one titanate compound other than the porous titanate compound has a median diameter (D50) of 20 to 60 µm.

<5> The friction material according to any one of <1> to <4>, wherein all of the two or more kinds of titanate compounds are potassium titanate.

<6> The friction material according to <5>, wherein the potassium titanate is potassium hexatitanate.

<7> The friction material according to any one of <1> to <6>, wherein a content of the two or more kinds of titanate compounds is from 5 to 40% by volume in total.

<8> The friction material according to any one of <1> to <7>, wherein a content of the porous titanate compound is from 1 to 20% by volume.

<9> The friction material according to any one of <1> to <8>, wherein a content of the at least one titanate compound other than the porous titanate compound is from 3 to 20% by volume.

<10> The friction material according to any one of <1> to <9>, wherein the friction modifier comprises the two kinds of titanate compounds, and a volume ratio of the porous titanate compound to the other titanate compound is from 1/10 to 5/1.

In an aspect of the present invention, a friction material containing no copper component, which improves wear resistance, ensure the friction coefficient in high-temperature and high-load braking, and further suppresses sticking to a counterpart material at high temperature, can be provided.

DETAILED DESCRIPTION OF THE INVENTION

Although the friction material in an aspect of the present invention is described in detail below, these only show examples of preferred embodiments, and the present invention is not specified to these embodiments.

However, a friction material in the present invention contains no copper component. The term "containing no copper component" means that the copper component is not contained as an effective component for exhibiting functions such as wear resistance, but does not mean, for example, that the copper component as an impurity or the like inevitably slightly contained in the friction material is not contained. From the viewpoint of environmental load, the amount of the copper component mixed as the impurity or the like is preferably 0.5% by mass or less.

The friction material in the present invention contains a friction modifier, a fiber base material and a binder.

<Friction Modifier>

The friction modifier is used for the purpose of imparting desired friction properties such as wear resistance, heat resistance and fade resistance.

The friction material contains two or more kinds of titanate compounds, and the above-described two or more kinds of titanate compounds have a median diameter (D50) of 20 μm or more, and at least one kind of the above-described two or more kinds of titanate compounds is a porous titanate compound (hereinafter also referred to as a titanate compound A). It has been found that inclusion of these two or more kinds of titanate compounds achieves both ensuring of the friction coefficient in high-temperature and high-load braking and the wear resistance, and can suppress sticking to a counterpart material.

The titanate compound A is the porous titanate compound in which crystal grains of the titanate compound are bonded by sintering and/or fusing, etc.

By allowing the titanate compound A to be contained in the friction material, the porosity of the friction material is effectively adjusted to impart suitable pores to the friction material. In the friction material, as a porosity adjusting effect thereof, gas is generated by decomposition of organic ingredients in the friction material in the high-temperature and high-load braking, and the gas is easily discharged from the pores to suppress a decrease in the friction coefficient. In addition, the titanate compound A is a compound having high heat resistance, wear resistance, etc., and increases the heat resistance, the wear resistance, etc. of the friction material. This also contributes to improvement in effectiveness of the friction material in the high-temperature and high-load braking.

The particle shape of the titanate compound A is preferably powdery, such as spherical or amorphous, and particularly preferably spherical. In addition, a crystal structure thereof is preferably a tunnel structure.

Further, of the above-described two or more kinds of titanate compounds, the median diameter (D50) of the titanate compound A is preferably the largest from the viewpoint of ensuring the effectiveness.

Furthermore, the median diameter (D50) of the particles of the titanate compound A is preferably from 70 to 200 μm, more preferably from 70 to 170 μm, and still more preferably from 70 to 150 μm. This is because when the median diameter (D50) of the particles of the titanate compound A is 70 μm or more, it is possible to suitably impart the pores to the friction material, and when it is 200 μm or less, uniform dispersion thereof in the friction material is possible.

The content of the titanate compound A is preferably from 1 to 20% by volume, more preferably from 2 to 15% by volume, and still more preferably from 5 to 15% by volume, in the whole friction material. This is because when the content of the titanate compound A in the whole friction material is 1% by volume or more, the pore imparting effect is improved, and when it is 20% by volume or less, it is possible to impart the suitable pores without deteriorating the wear resistance of the friction material.

The specific surface area of the titanate compound A is preferably from 1 to 13 $m^2/g$, and more preferably from 3 to 9 $m^2/g$. This is because when the specific surface area falls within the range of from 1 to 13 $m^2/g$, high-speed effectiveness can be ensured.

Further, as described above, the friction material also contains at least one kind of titanate compound (hereinafter also referred to as a titanate compound B), in addition to the titanate compound A.

By allowing the titanate compound B to be contained in the friction material, it contributes to reduction in the sticking to the counterpart material in the high-temperature and high-load braking. In addition, it also becomes possible to decrease the wear amount of the brake pad.

The titanate compound B preferably has the shape called scale-like (lamellar), columnar, plate or flat, and is particularly preferably columnar. In addition, the crystal structure thereof is preferably the tunnel structure. Furthermore, from the viewpoint of mechanical strength, the median diameter (D50) of the titanate compound B is preferably from 20 to 60 μm, more preferably from 20 to 55 μm, and still more preferably from 20 to 50 μm.

In this specification, the median diameter (D50) means a particle diameter corresponding to 50% cumulative percentage on a volume basis measured by determining the particle size distribution with a nano-particle diameter distribution measuring device.

The content of the titanate compound B is preferably from 3 to 20% by volume, more preferably from 5 to 18% by volume, and still more preferably from 5 to 15% by volume, in the whole friction material. This is because when the content of the titanate compound B is 3% by volume or more, the effect of suppressing the sticking to the counterpart material is improved, and when it is 20% by volume or less, the wear resistance of the friction material is excellent.

The specific surface area of the titanate compound B is preferably from 0.1 to 2.0 $m^2/g$, and more preferably from 0.2 to 1.5 $m^2/g$. When the specific surface area of the titanate compound B falls within the range of from 0.1 to 2.0 $m^2/g$, adhesion with the binder is excellent, and the strength or the wear resistance of the friction material is improved.

In this specification, the specific surface area is a value measured by a BET method by nitrogen gas adsorption.

The total content of the titanate compounds preferably falls within the range of 5 to 40% by volume, more preferably from 10 to 30% by volume, and still more preferably from 15 to 25% by volume, in the whole friction material. This is because when the total content of the titanate compounds is 5% by volume or more, the friction coefficient in the high-temperature and high-load braking is ensured and the wear resistance is improved, and when it is 40% by volume or less, it becomes possible to achieves both the ensuring of the friction coefficient in the high-temperature and high-load braking and the suppression of the sticking to the counterpart material at high temperature without deteriorating the wear resistance of the friction material.

In addition, when the two kinds of titanate compounds are contained as the friction modifier, the volume ratio of the titanate compound A to the other titanate compound is preferably from 1/10 to 5/1, and more preferably from 1/3 to 3/1, from the viewpoint of dispersibility.

Examples of the titanate compounds as used herein include potassium titanates such as potassium hexatitanate and potassium octatitanate, lithium titanate, lithium potassium titanate, sodium titanate, calcium titanate, magnesium titanate, magnesium potassium titanate, barium titanate, etc. However, in terms of improving the wear resistance, potassium hexatitanate, potassium octatitanate, lithium potassium titanate and magnesium potassium titanate are preferred, and of the potassium titanates, potassium hexatitanate is especially preferred.

In addition, from the viewpoint of improving the strength of the friction material, the titanate compound may be surface-treated with a silane coupling agent or the like on its surface. Further, from the viewpoint of enhancing water repellency of the friction material, the titanate compound may be surface-treated with a water-repellent agent on its surface.

From the viewpoint of suppressing rust generation of the friction material, it is desirable to decrease the sulfate ion concentration in the friction material, and it is also possible to use the titanate compound containing a small amount of sulfate ions.

An inorganic filler, an organic filler, an abrasive, a solid lubricant, etc. may also be appropriately mixed as the friction modifier contained in the friction material. The amount of the friction modifier including the titanate compound is preferably from 50 to 90% by volume, and more preferably from 60 to 80% by volume, in the whole friction material.

Examples of the inorganic fillers include inorganic materials such as barium sulfate, calcium carbonate, calcium hydroxide, vermiculite and mica, and metal powders such as aluminum, tin and zinc, in addition to the above-described titanate compounds. These are used either alone or as a combination of two or more thereof.

Examples of the organic fillers include various rubber powders (raw rubber powders, tire powders, etc.), cashew dust, melamine dust, etc. These are used either alone or as a combination of two or more thereof.

Examples of the abrasives include alumina, silica, magnesia, zirconia, zirconium silicate, chromium oxide, triiron tetraoxide ($Fe_3O_4$), chromite, etc. These are used either alone or as a combination of two or more thereof.

Examples of the solid lubricants include graphite, antimony trisulfide, molybdenum disulfide, tin sulfide, polytetrafluoroethylene (PTFE), etc. The particle diameter of graphite is preferably 1 to 1,000 μm. These are used either alone or as a combination of two or more thereof.

<Fiber Base Material>

As the fiber base material contained in the friction material, a fiber base material commonly used can be used in an amount commonly used. Specifically, organic fiber, inorganic fiber and metal fiber may be used, but a copper fiber or bronze fiber, which contains a copper component, is not used.

As the organic fiber, for example, aromatic polyamide (aramid) fiber and frame-resistant acrylic fiber may be used, and as the inorganic fiber, for example, ceramic fiber, bio-soluble inorganic fiber, glass fiber, carbon fiber, rock wool, etc. may be used. In addition, as the metal fiber, for example, steel fiber may be used. These are used either alone or as a combination of two or more thereof.

Furthermore, the amount of the fiber base material used in the friction material is preferably from 1 to 40% by volume, and more preferably from 5 to 30% by volume, in the whole friction material.

Above all, as the inorganic fiber, the bio-soluble inorganic fiber is preferred in terms of having a small influence on human body. Examples of such bio-soluble inorganic fibers include bio-soluble ceramic fibers such as $SiO_2$—$CaO$—$MgO$-based fibers, $SiO_2$—$CaO$—$MgO$—$Al_2O_3$-based fibers and $SiO_2$—$MgO$—$SrO$-based fibers, bio-soluble rock wools, etc.

The bio-soluble inorganic fiber preferably has a fiber diameter of 0.1 to 20 μm and a fiber length of 100 to 5000 μm.

In addition, from the viewpoint of improving the strength of the friction material, the bio-soluble inorganic fiber may be surface-treated with a silane coupling agent or the like on its surface.

<Binder>

As the binder contained in the friction material, various binders commonly used can be used. Specific examples thereof include thermosetting resins such as straight phenol resins, various phenol resins modified with elastomers, etc., melamine resins, epoxy resins and polyimide resins. Examples of the elastomer-modified phenol resins include acrylic rubber-modified phenol resins, silicone rubber-modified phenol resins, nitrile rubber (NBR)-modified phenol resins, etc. These binders may be used either alone or as a combination of two or more thereof.

In addition, the amount of the binder used in the friction material is preferably from 5 to 30% by volume, and more preferably from 10 to 25% by volume, in the whole friction material.

A specific embodiment of a method for producing the friction material can be performed by a conventional production process. For example, the friction material can be produced by blending the above-described respective ingredients and subjecting the resulting blend to steps of preforming, thermoforming, heating, grinding, etc. in accordance with an ordinary production process.

A general process in the production of a brake pad including the friction material is shown below:

(a) a step of forming a pressure plate into a predetermined shape with a sheet metal press, (b) a step of subjecting the above-described pressure plate to degreasing treatment, chemical conversion treatment and primer treatment, and applying an adhesive thereon, (c) a step of blending raw materials such as the fiber base material, the friction modifier and the binder, sufficiently homogenizing them by stirring, and forming the resulting blend at ordinary temperature and a predetermined pressure to produce a preformed body, (d) a thermoforming step of integrally firmly fixing the above-described preformed body to the pressure plate on which the adhesive has been applied, at a predetermined temperature and pressure (forming temperature: 130 to 180° C., forming pressure: 30 to 80 MPa, forming time: 2 to 10 min), and (e) a step of performing after-cure (at 150 to 300° C. for 1 to 5 hours), and finally performing finishing treatment such as grinding, scorching and painting.

EXAMPLES

The present invention is specifically described below with reference to Examples. However, the present invention should not be construed as being limited by these Examples in any way.

Examples 1 to 6, Comparative Examples 1 to 5, Reference Examples 1 and 2

<Production of Friction Material>

Raw materials of each blending composition shown in Table 1 were mixed by a mixer, and the mixed stirring materials were introduced into a mold, followed by performing preforming and hot-press molding to produce a friction material.

The preforming was performed by pressurizing at a pressure of 20 MPa for 5 seconds.

The preformed body was subjected to the hot-press molding at a pressure of 50 MPa and a molding temperature of 150° C. for 6 minutes, and subjected to after-cure at a temperature of 250° C., followed by processing, grinding and scorching. Thus, friction materials of Examples 1 to 6, Comparative Examples 1 to 5 and Reference Examples 1 and 2 were produced.

<Evaluation Tests of Friction Material>

For the above-described produced friction materials of Examples 1 to 6, Comparative Examples 1 to 5 and Reference Examples 1 and 2, an effectiveness test, a wear test and a high-temperature sticking test were performed. The results obtained are shown in Table 1.

(1) Effectiveness Test

The effectiveness test in accordance with JASO C406 "passenger car brake device dynamometer test procedure" was performed, and the friction coefficient ($\mu$) of second effectiveness (initial speed: 130 km/h, deceleration rate: 0.6 G) was measured. Based on the measured values, the evaluation was performed by the following criteria.

Criteria: $\mu > 0.40$: A, $0.40 \geq \mu > 0.36$: B, $0.36 \geq \mu$: C (2) Wear Test After the above-described effectiveness test had been performed, the wear amount X [mm] of the friction material was measured. Based on the measured values, the evaluation was performed by the following criteria.

Criteria: $X \leq 0.5$: A, $0.5 < X \leq 0.65$: B, $0.65 < X$: C (3) High-Temperature Sticking Test The test was performed only by a combination of fitting of JASO C406 "passenger car brake device dynamometer test procedure" and first fade, and setting was performed so that the rotor final temperature at the tenth braking in the first fade reached 650 to 700° C. At the tenth braking, after retention for 2 minutes while allowing a hydraulic pressure of 10 MPa to act thereon in stopping, a rotor was allowed to rotate when the liquid pressure was released, and the presence or absence of sticking of the friction material to the rotor was visually observed. The evaluation was performed by the following criteria.

Criteria: No sticking: A, a sticking part was larger than 0% of a sliding area and less than 15% thereof: B, a sticking part was 15% or more of a sliding area: C.

In Table 1, "Potassium titanate 1", "Potassium titanate 2", "Potassium titanate 3" and "Lithium potassium titanate" are as follows.

Potassium titanate 1: TERRACESS DPR-503 (potassium hexatitanate, tunnel structure, median diameter (D50): 80 μm, specific surface area: 6 m$^2$/g) manufactured by Otsuka Chemical Co., Ltd.

Potassium titanate 2: TERRACESS JSL-R (potassium hexatitanate, tunnel structure, median diameter (D50): 35 μm, specific surface area: 0.8 m$^2$/g) manufactured by Otsuka Chemical Co., Ltd.

Potassium titanate 3: TERRACESS TF-S (potassium octatitanate, tunnel structure, median diameter (D50): 7 μm, specific surface area: 3 m$^2$/g) manufactured by Otsuka Chemical Co., Ltd.

Lithium potassium titanate: TERRACESS L-SS (lamellar structure, median diameter (D50): 2.5 μm, specific surface area: 1.5 m$^2$/g) manufactured by Otsuka Chemical Co., Ltd.

TABLE 1

| | | Example | | | | | | Comparative Example | | | | | Reference Example | |
|---|---|---|---|---|---|---|---|---|---|---|---|---|---|---|
| | % by volume | 1 | 2 | 3 | 4 | 5 | 6 | 1 | 2 | 3 | 4 | 5 | 1 | 2 |
| Binder | Straight phenol resin | 17.5 | 17.5 | 17.5 | 17.5 | 17.5 | 17.5 | 17.5 | 17.5 | 17.5 | 17.5 | 17.5 | 17.5 | 17.5 |
| Friction modifier | Rubber dust | 5 | 5 | 5 | 5 | 5 | 5 | 5 | 5 | 5 | 5 | 5 | 5 | 5 |
| | Cashew dust | 10 | 10 | 10 | 10 | 10 | 10 | 10 | 10 | 10 | 10 | 10 | 10 | 10 |
| | Barium sulfate | 15 | 15 | 15 | 15 | 25 | 5 | 15 | 15 | 15 | 15 | 15 | 10 | 15 |
| | Tin sulfide | 3 | 3 | 3 | 3 | 3 | 3 | 3 | 3 | 3 | 3 | 3 | 3 | 3 |
| | Graphite | 5 | 5 | 5 | 5 | 5 | 5 | 5 | 5 | 5 | 5 | 5 | 5 | 5 |
| | Iron oxide | 2 | 2 | 2 | 2 | 2 | 2 | 2 | 2 | 2 | 2 | 2 | 2 | 2 |
| | Zirconium oxide | 3 | 3 | 3 | 3 | 3 | 3 | 3 | 3 | 3 | 3 | 3 | 3 | 3 |
| | Zirconium silicate | 1 | 1 | 1 | 1 | 1 | 1 | 1 | 1 | 1 | 1 | 1 | 1 | 1 |
| | Polytetrafluoroethylene | 0.5 | 0.5 | 0.5 | 0.5 | 0.5 | 0.5 | 0.5 | 0.5 | 0.5 | 0.5 | 0.5 | 0.5 | 0.5 |
| | Calcium hydroxide | 3 | 3 | 3 | 3 | 3 | 3 | 3 | 3 | 3 | 3 | 3 | 3 | 3 |
| | Mica | 2 | 2 | 2 | 2 | 2 | 2 | 2 | 2 | 2 | 2 | 2 | 2 | 2 |
| | Potassium titanate 1 (porous) | 2 | 5 | 10 | 15 | 5 | 15 | 20 | — | 10 | — | — | — | — |

TABLE 1-continued

| | % by volume | Example 1 | Example 2 | Example 3 | Example 4 | Example 5 | Example 6 | Comparative Example 1 | Comparative Example 2 | Comparative Example 3 | Comparative Example 4 | Comparative Example 5 | Reference Example 1 | Reference Example 2 |
|---|---|---|---|---|---|---|---|---|---|---|---|---|---|---|
| | Potassium titanate 2 | 18 | 15 | 10 | 5 | 5 | 15 | — | — | — | 10 | 10 | — | 20 |
| | Potassium titanate 3 | — | — | — | — | — | — | — | 20 | 10 | 10 | — | 20 | — |
| | Lithium potassium titanate | — | — | — | — | — | — | — | — | — | — | 10 | — | — |
| Fiber base material | Bio-soluble rock wool | 5 | 5 | 5 | 5 | 5 | 5 | 5 | 5 | 5 | 5 | 5 | 5 | 5 |
| | Aramid fiber | 8 | 8 | 8 | 8 | 8 | 8 | 8 | 8 | 8 | 8 | 8 | 8 | 8 |
| | Copper fiber | — | — | — | — | — | — | — | — | — | — | — | 5 | — |
| | Total | 100 | 100 | 100 | 100 | 100 | 100 | 100 | 100 | 100 | 100 | 100 | 100 | 100 |
| | Total of potassium titanate 1 and potassium titanate 2 | 20 | 20 | 20 | 20 | 10 | 30 | — | — | — | — | — | — | — |
| | Volume ratio of potassium titanate 1 to potassium titanate 2 | 1/9 | 1/3 | 1/1 | 3/1 | 1/1 | 1/1 | — | — | — | — | — | — | — |
| | JASO C-406 second effectiveness, 130 km/h, 0.6 G, friction coefficient [μ] | 0.40 B | 0.38 B | 0.41 A | 0.41 A | 0.39 B | 0.43 A | 0.40 B | 0.34 C | 0.35 C | 0.35 C | 0.33 C | 0.41 A | 0.36 C |
| | JASO C-406 pad wear amount [mm] at the time of test end | 0.42 A | 0.49 A | 0.48 A | 0.65 B | 0.52 B | 0.62 B | 0.70 C | 0.68 C | 0.67 C | 0.68 C | 0.70 C | 0.44 A | 0.41 A |
| | High-temperature sticking test | A | A | A | B | B | A | C | C | C | C | C | A | A |

The friction materials in Examples 1 to 6 each containing the two kinds of titanate compounds of the porous titanate compound (potassium titanate 1) and the other titanate compound (potassium titanate 2), both having median diameters (D50) equivalent to or more than the specified value, obtained excellent evaluation in the effectiveness test, the wear test and the high-temperature sticking test, as with the friction material in Reference Example 1 containing the copper component as the fiber base material, as compared with the friction materials in Comparative Examples 1 to 5 not having the combination of the above-described titanate compounds.

In addition, in Reference Example 2 containing potassium titanate 2 without using potassium titanate 1, the good results could be obtained in the wear test and the high-temperature sticking test, but the results of the effectiveness test were poor.

As described above, in an aspect of the present invention, a friction material containing no copper component, which improves wear resistance, ensure the friction coefficient in high-temperature and high-load braking, and further suppresses sticking to a counterpart material at high temperature, can be provided.

While the present invention has been described in detail and with reference to specific embodiments thereof, it will be apparent to one skilled in the art that various changes and modifications can be made therein without departing from the spirit and scope thereof.

The invention claimed is:

1. A friction material comprising a fiber base material, a friction modifier and a binder, wherein
   the friction modifier comprises two or more kinds of titanate compounds,
   the two or more kinds of titanate compounds have a median diameter (D50) of 20 μm or more,
   the two or more kinds of titanate compounds include a porous titanate compound having a median diameter (D50) of 70 μm to 200 μm and a titanate compound other than the porous titanate compound having a median diameter (D50) of 20 μm to 60 μm, and
   the friction material comprises no copper component.

2. The friction material according to claim 1, wherein all of the two or more kinds of titanate compounds are potassium titanate.

3. The friction material according to claim 2, wherein the potassium titanate is potassium hexatitanate.

4. The friction material according to claim 1, wherein a content of the two or more kinds of titanate compounds is from 5 to 40% by volume in total.

5. The friction material according to claim 1, wherein a content of the porous titanate compound is from 1 to 20% by volume.

6. The friction material according to claim 1, wherein a content of the titanate compound other than the porous titanate compound is from 3 to 20% by volume.

7. The friction material according to claim 1, wherein the friction modifier comprises the two kinds of titanate compounds, and a volume ratio of the porous titanate compound to the titanate compound other than the porous titanate compound is from 1/10 to 5/1.

8. The friction material according to claim 4, wherein all of the two or more kinds of titanate compounds are potassium titanate.

9. The friction material according to claim 5, wherein all of the two or more kinds of titanate compounds are potassium titanate.

10. The friction material according to claim 6, wherein all of the two or more kinds of titanate compounds are potassium titanate.

11. The friction material according to claim 1, wherein a content of the two or more kinds of titanate compounds is from 10 to 30% by volume in total.

12. The friction material according to claim 1, wherein a content of the two or more kinds of titanate compounds is from 15 to 25% by volume in total.

13. The friction material according to claim 2, wherein a content of the two or more kinds of titanate compounds is from 5 to 40% by volume in total.

14. The friction material according to claim 7, wherein a content of the two or more kinds of titanate compounds is from 5 to 40% by volume in total.

15. The friction material according to claim 8, wherein a content of the two or more kinds of titanate compounds is from 5 to 40% by volume in total.

16. The friction material according to claim 9, wherein a content of the two or more kinds of titanate compounds is from 5 to 40% by volume in total.

17. The friction material according to claim 1, wherein the porous titanate compound has a specific surface area of 1 to 13 $m^2/g$.

18. The friction material according to claim 1, wherein the titanate compound other than the porous titanate compound has a specific surface area of 0.1 to 2.0 $m^2/g$.

19. The friction material according to claim 1, wherein the porous titanate compound has a specific surface area of 3 to 9 $m^2/g$, and the titanate compound other than the porous titanate compound has a specific surface area of 0.2 to 1.5 $m^2/g$.

* * * * *